US009327595B2

(12) United States Patent
Miyamoto et al.

(10) Patent No.: US 9,327,595 B2
(45) Date of Patent: May 3, 2016

(54) FIXING STRUCTURE OF RESIN TANK (71) Applicant: KOMATSU LTD., Minato-ku, Tokyo (JP)

(72) Inventors: Hirofumi Miyamoto, Tokyo (JP); Kazuhiro Okamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/399,494

(22) PCT Filed: May 13, 2013

(86) PCT No.: PCT/JP2013/063255
§ 371 (c)(1),
(2) Date: Nov. 6, 2014

(87) PCT Pub. No.: WO2014/184837
PCT Pub. Date: Nov. 20, 2014

(65) Prior Publication Data
US 2015/0329242 A1    Nov. 19, 2015

(51) Int. Cl.
B60K 15/067 (2006.01)
B60K 15/063 (2006.01)
F16M 13/02 (2006.01)
F16B 2/06 (2006.01)
F16B 2/16 (2006.01)
B65D 25/20 (2006.01)
B60K 13/04 (2006.01)

(52) U.S. Cl.
CPC ............. B60K 15/063 (2013.01); B60K 13/04 (2013.01); B60K 15/067 (2013.01); B65D 25/20 (2013.01); F16B 2/06 (2013.01); F16B 2/16 (2013.01); F16M 13/02 (2013.01); B60K 2015/0675 (2013.01)

(58) Field of Classification Search
USPC .......... 180/68.5; 429/100; 248/499, 500, 510, 248/506, 503
See application file for complete search history.

(56) References Cited

U.S. PATENT DOCUMENTS 1,636,562 A * 7/1927 Hick ............................ 180/68.5
2,833,363 A * 5/1958 Henehan ...................... 180/68.5
(Continued)

FOREIGN PATENT DOCUMENTS

CN    102433908 A    5/2012
DE    1212432 B     3/1966
(Continued)

OTHER PUBLICATIONS

International Search Report dated Jul. 9, 2013 issued in International Application No. PCT/JP2013/063255.
(Continued)

Primary Examiner — Alfred J Wujciak
(74) Attorney, Agent, or Firm — Holtz, Holtz & Volek PC (57) ABSTRACT A fixing structure of a resin tank for stably keeping the resin tank being fixed includes: a first holder having a predetermined length and being disposed corresponding to a pressed portion of a resin tank; a biasing member that is disposed in the first holder; a pressing member that is supported by the first holder and projects toward the pressed portion by a biasing force of the biasing member; and a pair of rods respectively having first ends attached to both ends of the first holder in a longitudinal direction and second ends attached to a frame.

6 Claims, 4 Drawing Sheets

(56) References Cited

U.S. PATENT DOCUMENTS

| | | | |
|---|---|---|---|
| 6,508,322 B2 * | 1/2003 | Dignitti et al. | 180/68.5 |
| 9,083,031 B2 * | 7/2015 | Bolden et al. | |
| 2012/0056412 A1 | 3/2012 | Kawamoto et al. | |

FOREIGN PATENT DOCUMENTS

| | | | |
|---|---|---|---|
| JP | 0219827 U | 2/1990 | |
| JP | 0242870 U | 3/1990 | |
| JP | 2000064351 A | 2/2000 | |
| JP | 2011131730 A | 7/2011 | |
| JP | 2011168088 A | 9/2011 | |
| JP | 2013079704 A | 5/2013 | |
| WO | 2011078238 A1 | 6/2011 | |

OTHER PUBLICATIONS

Chinese Office Action (and English translation thereof) dated Jun. 26, 2015, issued in counterpart Chinese Application No. 201380017947.7.

International Preliminary Report on Patentability (IPRP) including Written Opinion (in English) dated Nov. 17, 2015, issued in parent International Application No. PCT/JP2013/063255.

Extended European Search Report dated Dec. 8, 2015, issued in counterpart European Application No. 13879250.2.

* cited by examiner

FIXING STRUCTURE OF RESIN TANK

TECHNICAL FIELD

The present invention relates to a fixing structure of a resin tank for accumulating a reductant to be supplied, for instance, to an exhaust gas aftertreatment device installed in a construction machine.

BACKGROUND ART

In accordance with regulation of exhaust gas discharged from an engine in a construction machine, it has been proposed to install an exhaust gas aftertreatment device provided with an SCR (Selective Catalytic Reduction). In order to work the SCR, it is necessary to supply a reductant such as a urea aqueous solution into the exhaust gas. Accordingly, a resin tank (i.e., a resin-made tank) in which the reductant is accumulated is set in the construction machine.

It has typically been known that such a resin tank is fixed by a fixing band to a bracket provided to a vehicle (see, for instance, Patent Literature 1). The fixing band disclosed in Patent Literature 1 has a belt-like portal metal plate including an upper piece and vertical pieces that are respectively integrated with both ends of the upper piece. A fastening fixation member shaped in a bolt is suspended from a lower end of each of the vertical pieces of the metal plate. In the metal plate, a middle portion of the upper piece extending across over the resin tank is curved in a manner to project toward the resin tank. This curved portion is pressed against the resin tank. While the curved portion is pressed against the resin tank, the fastening fixation member penetrates the bracket and is fastened with a nut.

With such a fixing band, even when the resin tank is shrunken at low temperatures in a cold area, the curved portion can be kept being pressed against the resin tank by elastic force of the curved portion of the metal plate, so that the resin tank can be favorably kept being fixed.

CITATION LIST

Patent Literature(S)

Patent Literature 1: JP-UM-A-2-19827

SUMMARY OF INVENTION

Problems to be Solved by the Invention

However, although the fixing band disclosed in Patent Literature 1 has a simple structure using elastic deformation of the belt-like metal plate, reliability of the fixing band is not always sufficient.

Specifically, since the upper piece of the metal plate is curved, when the metal plate is fixed to a resin tank in a typical size, the curved portion is straightened, so that the upper piece is made substantially linear. Accordingly, since the upper piece is straightened, both ends of the upper piece are shifted outward, so that the vertical pieces are slightly tilted outward.

On the contrary, when the resin tank is shrunken, the upper piece is returned to the curved shape, both ends of the upper piece are also shifted inward, so that the tilted vertical pieces are returned to a substantially vertical condition.

Thus, every time shrinkage and recovery of the resin tank are repeated, both ends of the upper piece of the metal plate are shifted inward and outward, so that tilt and recovery of the vertical pieces are repeated. For this reason, the fastening fixation member and the nut at a lower side of the vertical pieces are not stably fastened with each other. Since the above fastened state is possibly loosened during a long time use, the resin tank may not be sufficiently kept being fixed.

An object of the invention is to provide a fixing structure of a resin tank for stably keeping the resin tank being fixed.

Means for Solving the Problems

According to an aspect of the invention, a fixing structure of a resin tank for fixing the resin tank to a frame includes: a first holder having a predetermined length and being disposed corresponding to a pressed portion of the resin tank; a biasing member that is disposed in the first holder; a pressing member that is supported by the first holder and projects toward the pressed portion by a biasing force of the biasing member; and a pair of rods respectively having first ends attached to both ends of the first holder in a longitudinal direction and second ends attached to the frame.

According to the above aspect of the invention, since the pressing member projects by the biasing force of the biasing member when the resin tank shrinks, the projecting pressing member can press the pressed portion of the resin tank, thereby favorably keeping the resin tank fixed. In this arrangement, since the biasing member is supported by the first holder and is not directly supported by the rods, even when the biasing member is deformed or the like in accordance with the shrinkage of the resin tank, this deformation does not affect an attachment portion of the first holder to the rods or an attachment portion of the rods to the frame, so that the first holder and the rods are stably attachable to each other while the rods and the frame are stably attachable to each other, thereby ensuring a high reliability.

In the fixing structure of the resin tank according to the above aspect of the invention, the biasing member is preferably a coil spring expandable and contractable in the longitudinal direction of the first holder.

According to the above aspect of the invention, the coil spring is used as the biasing member. As the coil spring, a long coil spring is usable in the longitudinal direction of the first holder, whereby a spring coefficient of the coil spring can be set small. Accordingly, in the above aspect of the invention in which the pressing member projects in accordance with the shrinkage of the resin tank, a change in the pressing force against the projection of the pressing member is reducible, so that the pressed portion of the resin tank can be pressed with a stable pressing force even when the shrinkage of the resin tank is significantly fluctuated.

The fixing structure of the resin tank according to the above aspect of the invention preferably further includes a second holder that is disposed in parallel to the first holder and in contact with the pressed portion, the second holder being movable in an axial direction of the rods between the first holder and the pressed portion.

According the above aspect of the invention, the pressing force by the pressing member is transmitted to the pressed portion of the resin tank via the second holder. Accordingly, when the second holder having a predetermined length is used, the second holder can press a broad range of the resin tank in the longitudinal direction of the second holder, irrespective of shapes and the like of the portion actually pressed by the pressing member. Consequently, this arrangement can further improve vibration resistance and shock resistance of the resin tank as compared with an instance where a narrow range of the resin tank is directly pressed by the pressing member, so that a more stable fixing structure of the resin tank is achievable.

In the fixing structure of the resin tank according to the above aspect of the invention, the pressed portion is preferably an edge of the resin tank.

According to the above aspect of the invention, since a relatively highly rigid and less deformable edge is pressed among parts of the resin tank, the pressing force is reliably transmittable to the resin tank, thereby fixing the resin tank in a more favorable condition.

According to another aspect of the invention, a fixing structure of a resin tank for fixing the resin tank to a frame includes: a first holder having a predetermined length and being disposed corresponding to a pressed portion of the resin tank; a biasing member that is disposed in the first holder; a pressing member that is supported by the first holder and projects toward the pressed portion by a biasing force of the biasing member; and a pair of rods respectively having first ends attached to both ends of the first holder in a longitudinal direction and second ends attached to the frame, in which the biasing member is a coil spring expandable and contractable in the longitudinal direction of the first holder, the pressing member includes: an insertion bar that is inserted into the coil spring and is biased by the coil spring in a longitudinal direction of the first holder; a shaft that projects from an end of the insertion bar; and a roller that is rotatably provided at the ends of the insertion bar and projects toward the pressed portion, and the first holder has an elongated hole through which the shaft is inserted to guide the roller to project toward the pressed portion.

According to still another aspect of the invention, a fixing structure of a resin tank for fixing the resin tank to a frame includes: a first holder having a predetermined length and being disposed corresponding to a pressed portion of the resin tank; a biasing member that is disposed in the first holder; a pressing member that is supported by the first holder and projects toward the pressed portion by a biasing force of the biasing member; a pair of rods respectively having first ends attached to both ends of the first holder in a longitudinal direction and second ends attached to the frame, and a second holder that is disposed in parallel to the first holder and in contact with the pressed portion, the second holder being movable in an axial direction of the rods between the first holder and the pressed portion, in which the biasing member is a coil spring expandable and contractable in the longitudinal direction of the first holder, the pressing member includes: an insertion bar that is inserted into the coil spring and is biased by the coil spring in a longitudinal direction of the first holder; a shaft that projects from an end of the insertion bar; and a roller that is rotatably provided at the ends of the insertion bar and projects toward the pressed portion, and the first holder has an elongated hole through which the shaft is inserted to guide the roller to project toward the pressed portion.

DESCRIPTION OF EMBODIMENT(S)

An exemplary embodiment of the invention will be described below with reference to the drawings.

Figure 1:
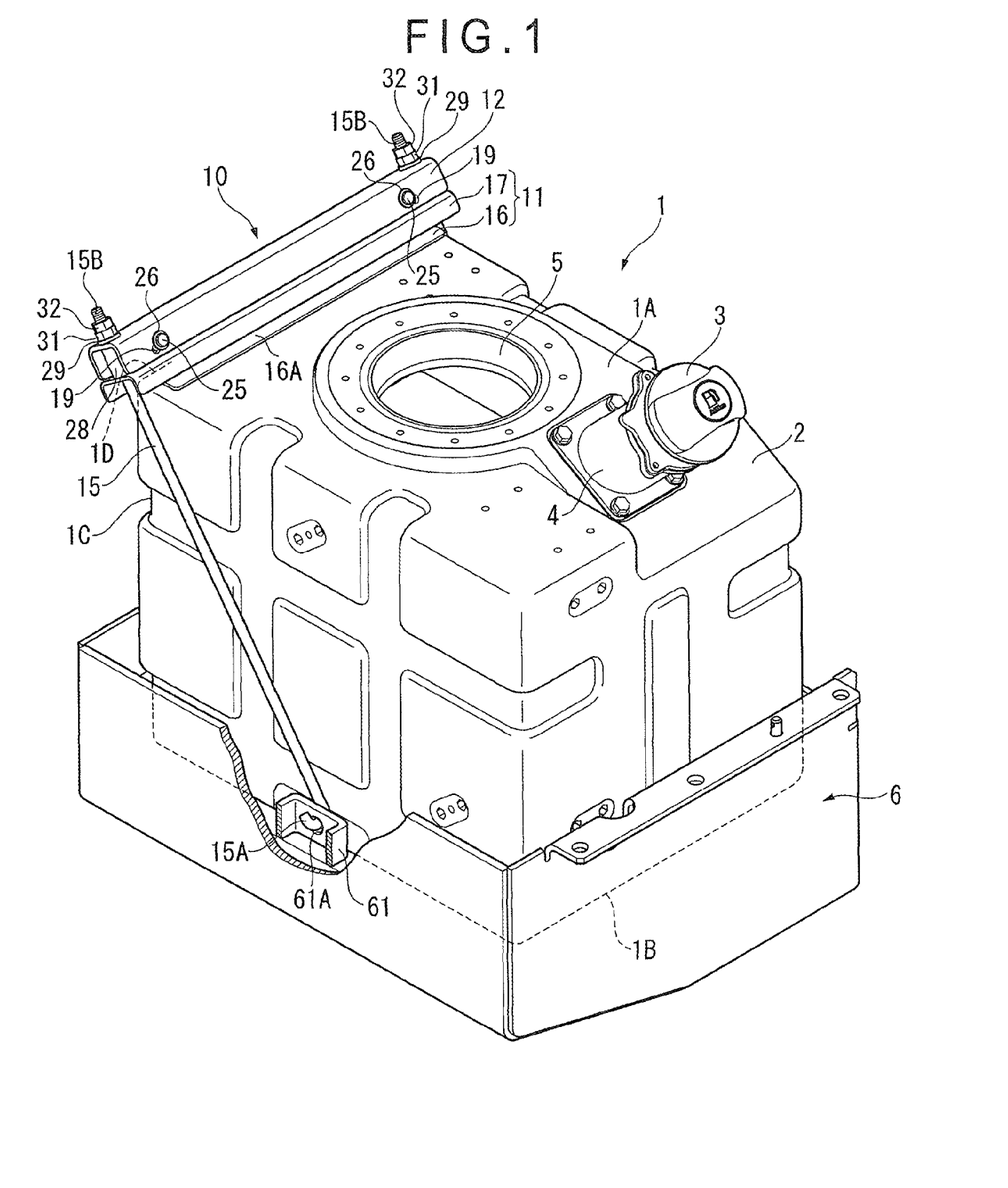
FIG. 1 is a perspective view showing a fixing structure of a resin tank according to an exemplary embodiment of the invention.

FIG. 1 is a perspective view showing a fixing structure of a resin tank 1 according to the exemplary embodiment.
Brief Description of Resin Tank In FIG. 1, for instance, a reductant to be supplied to an exhaust gas aftertreatment device (not shown) installed in a construction machine (e.g., a wheel loader) is accumulated in the resin tank 1.

Herein, the exhaust gas aftertreatment device includes: a DPF (Diesel Particulate Filter) that collects PM (Particulate Matter) in exhaust gas; and an SCR (Selective Catalytic Reduction) disposed on a downstream side of the DPF. The reductant to be accumulated in the resin tank 1 is a urea aqueous solution in the exemplary embodiment. The urea aqueous solution is sprayed into the exhaust gas after passing through the DPF and fed to the SCR together with the exhaust gas.

The resin tank 1 is made of a synthetic resin and is producible from a tubular parison by a blow molding and the like. However, the molding method of the resin tank 1 is not limited to the blow molding, but any molding methods are applicable as long as a box-shaped container is moldable. A material for the synthetic resin may be determined from generally usable materials as long as the material is not adversely affected by the reductant.

The overall resin tank 1 is substantially shaped in a box. An inclined portion 2 is provided on a part of an upper surface 1A of the resin tank 1. A supplier 4 of the reductant, which is openable and closeable by a cap 3, is provided on the inclined portion 2. A circular opening 5 is provided on the upper surface 1A of the resin tank 1. The opening 5 is covered with a disc lid (not shown) to be fixed with a plurality of bolts. A drain opening (not shown) for discharging the reductant is openably/closeably provided at an appropriate position of a lower surface 1B of the resin tank 1.

A plurality of tubes penetrate the lid with which the opening 5 is covered. The tubes include a tube for sucking the reductant in the resin tank 1 by a supply pump and feeding the reductant to an injector attached to the exhaust gas aftertreatment device and a tube for returning a residue of the reductant, which is left without being injected by the injector, to the resin tank 1.

In addition, an inlet and an outlet of a cooling water tube penetrate the lid such that a part of the engine cooling water passes through the resin tank 1. In cold areas, an engine cooling water heated to a predetermined temperature or higher is used so as to defrost a frozen reductant. In addition to the above components, a liquid surface sensor that detects an accumulation amount of the reductant, a breather that regulates pressure in the resin tank 1, and the like are provided to the lid. A signal line from the liquid surface sensor is also drawn out from an upper portion of the lid.

The resin tank 1 is disposed with a lower portion thereof being housed in a box-shaped housing portion (frame) 6 provided to a vehicle frame of the construction machine. The resin tank 1 disposed in the housing portion 6 is fixed by a fixing component 10. In other words, in the exemplary embodiment, a fixing structure using the fixing component 10 is employed for fixing the resin tank 1 to the housing portion 6. Since the resin tank 1 made of synthetic resins shrinks in a low-temperature environment, the fixing component 10 has a function for keeping the resin tank 1 fixed in accordance with the shrinkage of the resin tank 1. A detailed structure of the fixing component 10 will be described below.

Description of Fixing Component

Figure 2:
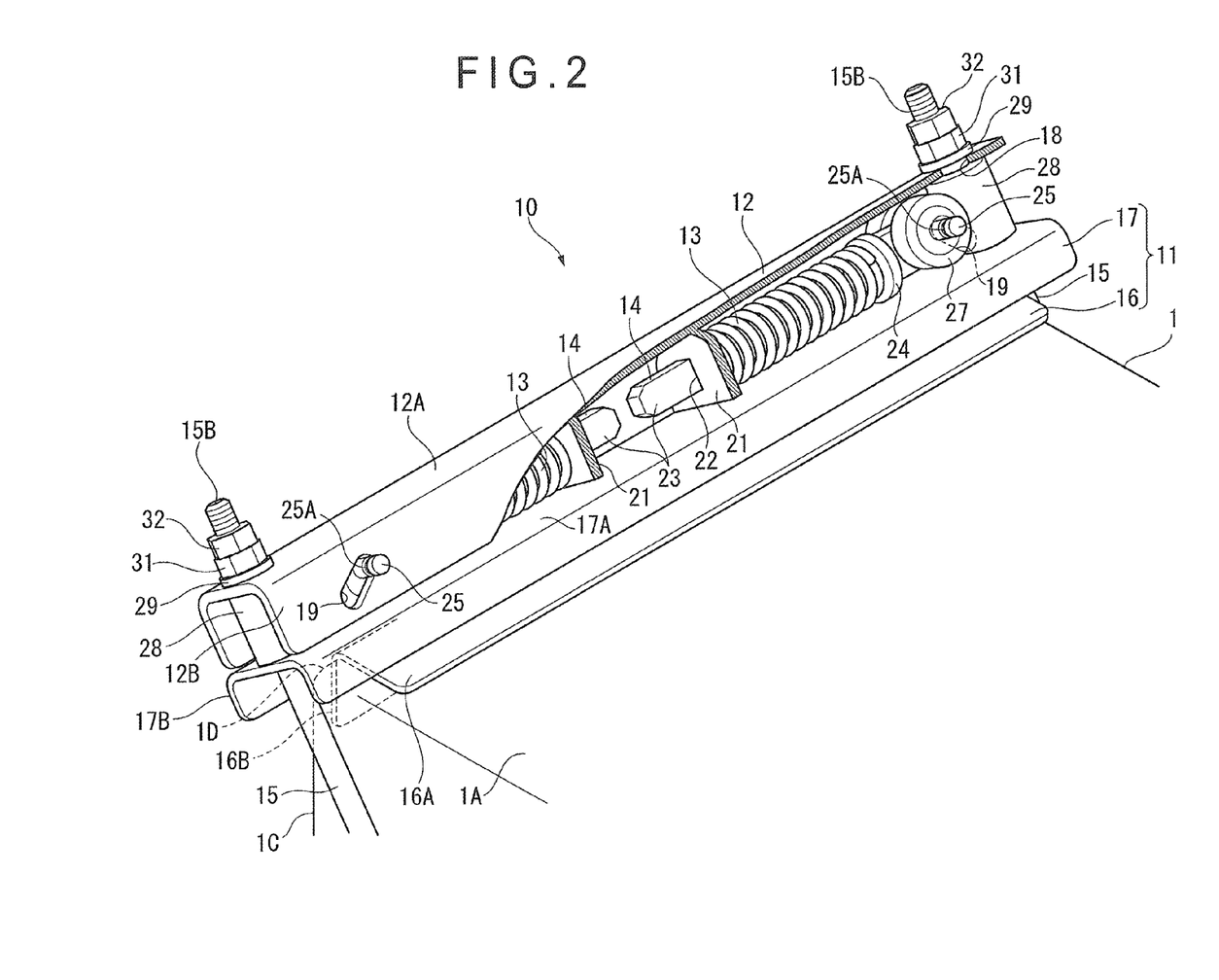
FIG. 2 is a partial cross-sectional perspective view showing a relevant part of a fixing component used in the fixing structure.
Figure 3:
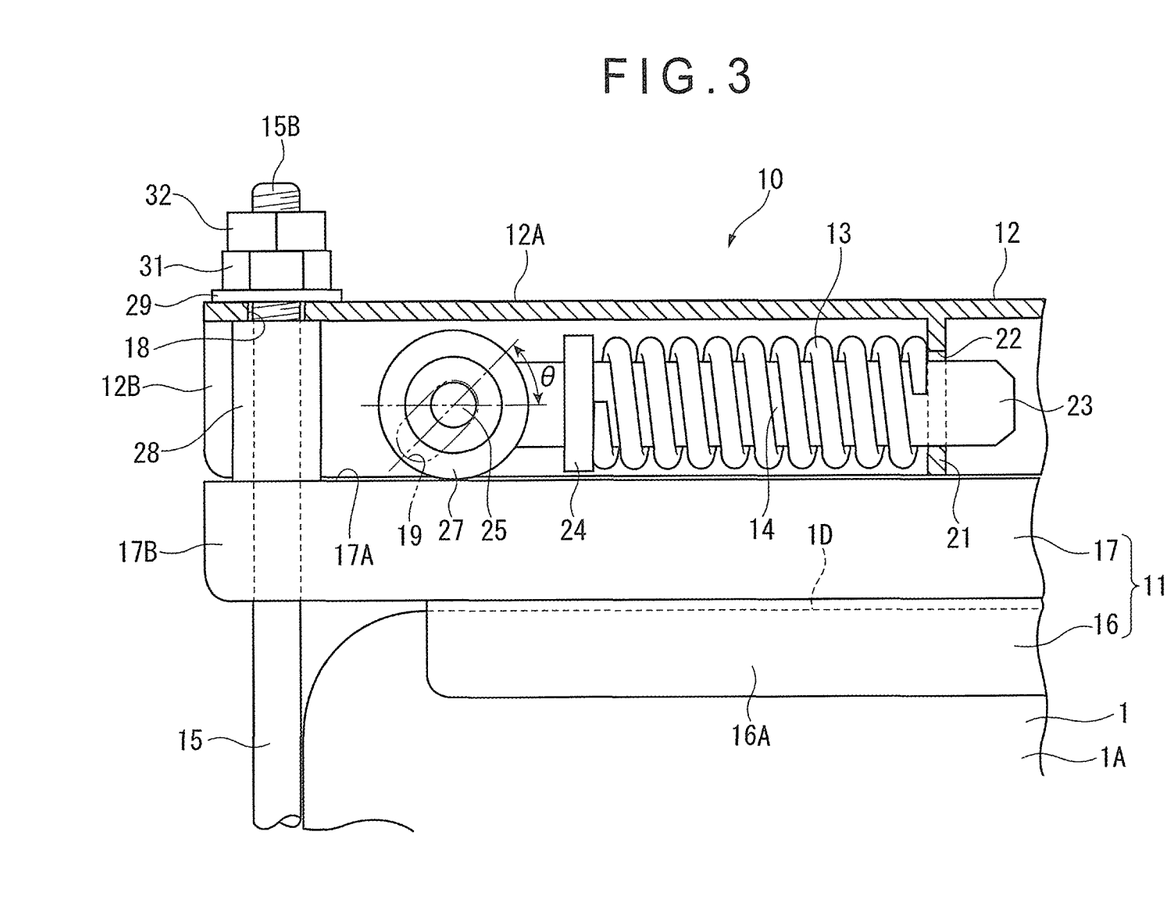
FIG. 3 is a cross-sectional view for explaining the fixing component attached to the resin tank in a normal condition.

FIG. 2 is a partial cross-sectional perspective view showing a relevant part of the fixing component 10. FIG. 3 is a cross-sectional view for explaining the fixing component 10 to the resin tank in a normal condition. Note that the normal condition means that the resin tank 1 is not shrunk. The normal condition is also occasionally referred to as an initial condition, hereinafter.

As shown in FIGS. 1 to 3, the fixing component 10 includes: a contact holder (a second holder) 11 having a predetermined length and being applied to the resin tank 1; a housing holder (a first holder) 12 having a predetermined length and being disposed on the contact holder 11; a pair of coil springs (biasing members) 13, 13 that are housed in the housing holder 12; a pair of pressing members 14, 14 that are supported in the housing holder 12 and biased by the respective coil springs 13, 13 in a predetermined direction; and a pair of rods 15, 15 that respectively penetrate both ends of the contact holder 11 and both ends of the housing holder 12, a first end of each of the rods 15 being attached to the housing holder 12, a second of each of the rods 15 being engaged with the housing portion 6 of the resin tank 1.

Contact Holder

The contact holder 11 is in contact with an edge (a pressed portion) 1D that is defined by an intersection portion of an upper surface 1A and a rear surface 1C of the resin tank 1. More specifically, the contact holder 11 includes: a contact member 16 having an L-shaped cross section and including a horizontal piece 16A and a rear surface 1C that are respectively in contact with the upper surface 1A and the vertical piece 16B including the edge 1D (FIG. 2); and a receiving member 17 having a C-shaped cross section that is open toward the contact member 16. The contact member 16 and the receiving member 17 are produced of a metal plate by punching processing, bending processing and the like.

The receiving member 17 having a C-shaped cross section includes: an upper piece 17A having a predetermined length and facing the housing holder 12; and a pair of bent pieces 17B, 17B that are bent along a longitudinal direction thereof toward the upper piece 17A. The receiving member 17 is applied to the contact member 16 having the L-shaped cross section, in a direction to bisect a right angle of the bent portion of the contact member 16 (in a direction at approximately 45 degrees against the horizontal piece 16A). Lower ends of the bent pieces 17B of the receiving member 17 in the longitudinal direction are respectively connected to the horizontal piece 16A and the vertical piece 16B of the contact member 16 by welding and the like.

The contact holder 11 moves between the edge 1D of the resin tank 1 and the housing holder 12 along an axis of the rod(s) 15. Accordingly, when the resin tank 1 shrinks, the contact holder 11 moves downward in the figure in accordance with this shrinkage while the contact holder 11 moves upward in accordance with recovery of the initial shape of the resin tank 1.

Housing Holder

The housing holder 12 has a C-shaped cross section that is open toward the receiving member 17 and is also disposed corresponding to the edge 1D of the resin tank 1 in the same manner as the receiving member 17. The housing holder 12 also includes: an upper piece 12A; and a pair of bent pieces 12B, 12B that are bent along a longitudinal direction thereof toward the upper piece 12A. The housing holder 12 and the contact holder 11 are disposed in parallel with each other.

A height of the bent piece 12B of the housing holder 12 is larger than a height of the bent piece 17B of the receiving member 17. A coil spring 13, a pressing member 14 and a spacer 28 are housed in a housing space surrounded by the upper piece 12A and the bent pieces 12B having a larger height. The housing holder 12 is also produced of a metal plate by punching processing, bending processing and the like.

The housing holder 12 has a through hole 18 on each of longitudinal ends of the upper piece 12A, through which the rod 15 is inserted. A through hole similar to the through hole 18 is also provided on the upper piece 17A of the receiving member 17 of the contact holder 11, but is not shown in FIGS. 1 to 3.

An elongated hole 19 that penetrates through the front and back of each of the bent pieces 12B is provided on each of longitudinal sides of each of the bent pieces 12B. The elongated holes 19 respectively provided on first ends of the bent pieces 12B face each other while the elongated holes 19 respectively provided on second ends of the bent pieces 12B face each other. A shaft 25 of a later-described pressing member 14 is inserted through the facing elongated holes 19. A longitudinal direction of each of the elongated holes 19 is inclined relative to the longitudinal direction of the housing holder 12. In other words, each of the elongated holes 19 is inclined such that the inserted shaft 25 is positioned lower toward each of ends of the housing holder 12. In the exemplary embodiment, an inclination angle θ (FIG. 3) of a longitudinal axis of each of the elongated holes 19 relative to a longitudinal axis of the housing holder 12 is approximately 30 degrees.

A pair of partitions 21, 21 are provided with an interval therebetween in the housing space of the housing holder 12. An insertion hole 22 is provided penetrating the front and back of each of the partitions 21. Each of the partitions 21 is formed by, for instance, welding a rectangular punched metal plate to the upper piece 12A and the bent piece 12B.

Coil Spring

The coil spring 13 is a compression spring that is disposed in a manner to expand and contract in the longitudinal direction of the housing holder 12. The coil spring 13 is housed in the housing space of the housing holder 12 in such a manner to be compressed between each of the partitions 21 and each of the ends of the housing holder 12. A first end of the coil spring 13 is in contact with a spring seat 24 of the pressing member 14 disposed at the same position as the coil spring 13. A second end of the coil spring 13 is in contact with each of the partitions 21 also serving as a spring seat. Accordingly, the coil spring 13 biases the pressing member 14 toward the end of the housing holder 12 through the spring seat 24.

In this arrangement, the pressing member 14 according to the exemplary embodiment is movable forward and backward substantially in the longitudinal direction of the housing holder 12 by a biasing force of the coil spring 13 and counterforce of the contact holder 11. The coil spring 13 expands and contracts in accordance with this movement. A spring coefficient of the coil spring 13 is set such that the biasing force of the coil spring 13 to the pressing member 14 does not change drastically even when the coil spring 13 expands and contracts in accordance with the movement of the pressing member 14.

Pressing Member

The pressing member 14 includes an insertion bar 23 to be inserted into the coil spring 13. A base end of the insertion bar 23 is inserted in the insertion hole 22 of each of the partitions 21. At the base end of the insertion bar 23, a length of the insertion bar 23 projecting from the insertion hole 22 is long enough that the insertion bar 23 is not drawn out of the insertion hole 22 even when the pressing member 14 moves at the maximum distance toward the end of the housing holder 12.

On the other hand, the flanged spring seat 24 is provided near a distal end of the insertion bar 23. As described above, the first end of the coil spring 13 is in contact with the spring seat 24 and the entire pressing member 14 is biased toward the end of the housing holder 12. At the distal end of the insertion bar 23, the shaft 25 projects in a direction intersecting with a longitudinal direction of the insertion bar 23.

The shaft 25 is inserted through the facing elongated-holes 19 of the housing holder 12. The shaft 25 can also be inserted into and drawn out of the insertion bar 23. The shaft 25 has a peripheral groove 25A near a distal end thereof. By fitting an E-ring 26 (FIG. 1) into the peripheral groove 25A outside each of the elongated holes 19, the inserted shaft 25 for serving as the fixing component 10 is prevented from being drawn out.

While being guided by the elongated holes 19, the shaft 25 moves by the biasing force of the coil spring 13 and the counterforce of the contact holder 11. The movement of the shaft 25 causes the entire pressing member 14 to move. The shaft 25 is supported by a pair of rotatable rollers 27 while the insertion bar 23 is interposed between the rollers 27.

Each of the rollers 27 is in contact with the upper piece 17A of the receiving member 17 of the contact holder 11 and is rotated in accordance with the movement of the shaft 25 in the elongated holes 19. Moreover, the shaft 25 applies a pressing force toward the contact holder 11 as a component force of the biasing force of the coil spring 13. Note that the length of each of the elongated holes 19 is determined based on an assumable maximum shrinkage of the resin tank 1. By setting the length of each of the elongated holes 19 such that the shaft 25 is not brought into contact with lower ends of the respective elongated holes 19 even when the resin tank 1 shrinks at the maximum level, the rollers 27 can constantly press the upper piece 17A.

When the contact holder 11 moves downward in accordance with the shrinkage of the resin tank 1, due to such a pressing force, the rollers 27 project toward the contact holder 11 (the edge 1D of the resin tank 1) from the housing space in the housing holder 12, so that the upper piece 17A is kept being pressed by the contact holder 11.

On the contrary, when the shape of the resin tank 1 is recovered, the rollers 27 receive force from the contact holder 11 moving upward, so that the rollers 27 are housed in the housing space.

Rod

As shown in FIGS. 1 to 3, the rod 15 is provided by a steel rod having a predetermined diameter and includes: an engaging portion 15A defined by bending a lower end of the steel rod; and a male screw 15B that is externally threaded to an upper end of the steel rod. An upper portion of the rod 15 penetrates a through hole (not shown) of the contact holder 11 and the through hole 18 of the housing holder 12. The cylindrical spacer 28 is held between the contact holder 11 and the housing holder 12. The rod 15 penetrates the spacer 28.

The engaging portion 15A of the rod 15 is in engagement with an engagement hole 61A of a bracket 61 fixed to an inner surface of the housing portion 6. A washer 29 is inserted to the male screw 15B of the rod 15 and nuts 31, 32 (double nuts) are fastened to the male screw 15B.

When the fixing component 10 is set on the resin tank 1 in the normal condition (the initial shape) and the nuts 31, 32 are fastened, such a fastening force acts on the resin tank 1 through the housing holder 12, spacer 28 and contact holder 11. In addition, the pressing force generated by the coil spring 13 acts on the resin tank 1 through the rollers 27 and the contact holder 11.

Operation of Fixing Component

An operation of the fixing component 10 will be described below with reference to FIGS. 3 and 4.

As shown in FIG. 3, when the fixing component 10 is attached to the resin tank 1 in the normal condition, the housing holder 12 is in contact with the contact holder 11 through the spacer 28, so that the fastening force of the nuts 31, 32 acts on the resin tank 1 as described above. The shaft 25 of each of the pressing members 14 is located on upper sides of the respective elongated holes 19, so that the rollers 27 press the contact holder 11 while substantially the entire rollers 27 are housed in the housing space of the housing holder 12. By these fastening force and pressing force, the resin tank 1 is favorably fixed to the housing portion 6.

Figure 4:
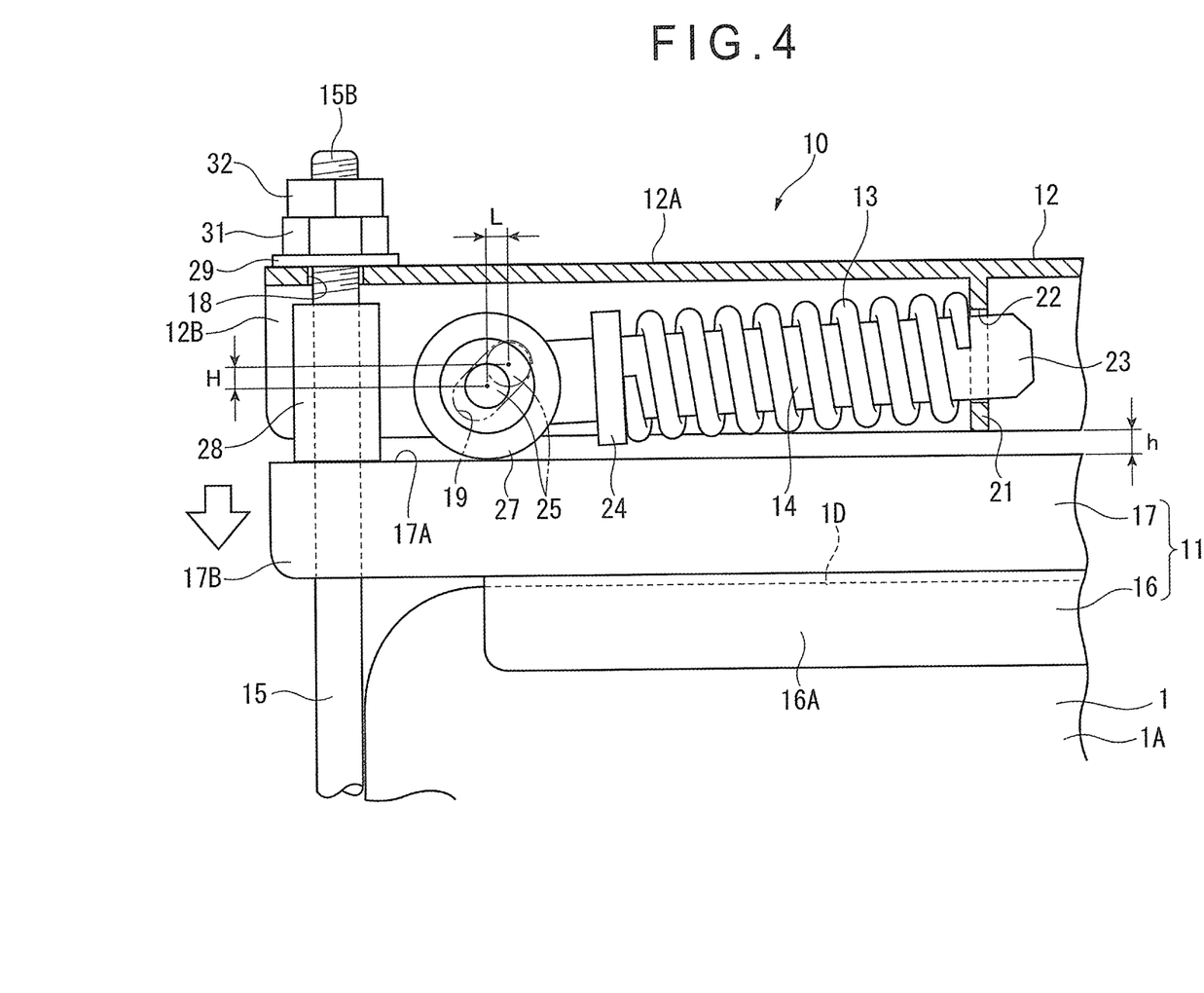
FIG. 4 is a cross-sectional view for explaining the fixing component attached to a shrunken resin tank.

On the other hand, FIG. 4 shows the resin tank 1 shrunken in a low-temperature environment and the like. In such a condition, in accordance with the shrinkage of the resin tank 1, the contact holder 11 in contact with the resin tank 1 also moves downward in the figure. Accordingly, each of the spacers 28 is no longer held between the contact holder 11 and the housing holder 12, so that the fastening force of the nuts 31, 32 acting on the resin tank 1 through the spacers 28 tends to be decreased.

However, since the rollers 27 also move in accordance with the movement of the contact holder 11 and each of the shafts 25 also moves within the elongated holes 19, the rollers 27 keep pressing the contact holder 11, so that the resin tank 1 can be kept being fixed. In FIG. 4, each of the shafts 25 positioned on the upper sides of the respective elongated holes 19 (shown by a chain line) is guided by the elongated holes 19 to move toward ends of the respective elongated holes 19 by a displacement L in the longitudinal direction of the housing holder 12 and simultaneously move toward the contact holder 11 by a displacement H in a direction away from the contact holder 11. The displacement H is the same as the shrinkage h of the resin tank 1 (H=h).

Since each of the shafts 25 is in contact with the inner surface of each of the elongated holes 19 and the biasing force of the coil spring 13 acts in such a condition, a reaction force opposite to the pressing force generated by the rollers 27 is generated on the inner surface of each of the elongated holes 19, thereby pushing the housing holder 12 upward. The reaction force acts on the fastened nuts 31 and 32, thereby preventing the nuts 31 and 32 from being loosened, so that there is no fear of a significant decline of the fastening force.

Since the contact holder 11 moves upward when the resin tank 1 recovers the initial shape, this movement causes counterforce on the contact holder 11. Accordingly, the contact holder 11 moves the rollers 27 and the shaft 25 upward against the pressing force of the coil spring 13. Consequently, the fixing condition of the resin tank 1 is returned to the condition shown in FIG. 3. Thus, even when the shrinkage and recovery of the resin tank 1 are repeated, a change in the shape of the expandable and contractable coil spring 13 does not affect an attachment portion of the rod 15 to the housing holder 12 and an attachment portion of the rod 15 to the housing portion 6, so that the rod 15 and the housing holder 12 are stably attachable to each other while the rod 15 and the housing portion 6 are stably attachable to each other.

Modification(s)

The scope of the invention is not limited to the above-described embodiments, but includes modifications and improvements as long as an object of the invention can be achieved.

Although the fixing component 10 presses the edge 1D of the resin tank 1 in the above exemplary embodiment, this arrangement is not exhaustive. For instance, the rod may be vertically provided, whereby a center part of the resin tank may be pressed by the fixing component. A part to be pressed of the resin tank may be appropriately determined in consideration of a fixable position of the fixing component based on a surface structure and the like of the resin tank. However, the arrangement in which the relatively highly rigid edge 1D is pressed among the parts of the resin tank 1 as in the above exemplary embodiment is favorable since the pressing force is reliably transmittable to the resin tank 1.

Although the contact holder 11 is used as the second holder of the invention in the above exemplary embodiment, the contact holder 11 is not essential in the invention but omittable. However, when the pressing force is transmitted substantially by point contact as pressed by the rollers 27 (pressing member), the pressing force from the rollers 27 is favorably transmitted via the contact holder 11. This arrangement allows a broad range of the resin tank 1 to be pressed, thereby improving vibration resistance and shock resistance of the resin tank 1.

Although the coil springs 13 are disposed in the longitudinal direction of the housing holder 12 in the above exemplary embodiment, shorter coil spring(s) may be disposed in a direction orthogonal to the longitudinal direction, where the shorter coil spring(s) may move in accordance with the shrinkage of the resin tank by being expanded and contracted in the shrinking direction of resin tank.

The number of the coil spring and the pressing member is not limited to a pair of each of those as in the above exemplary embodiment, but may be one or three or more as needed.

In the above exemplary embodiment, the rollers 27 for transmitting the pressing force from the pressing member 14 includes, in place of the rollers 27, a member having a flat pressing surface may be used to transmit the pressing force to the contact holder 11 through the pressing surface. A structure of the pressing member may be determined as needed for implementing the invention.

In the above exemplary embodiment, the coil spring 13 is used as the biasing member of the invention. However, a spring having other structures such as a plate spring and a torsion spring may be used. Alternatively, an elastic body such as synthetic rubber providing the displacement and the biasing force enough to follow the shrinkage of the resin tank may be used.

The resin tank 1 in which the reductant to be supplied to the SCR is accumulated is described as the resin tank of the invention in the above exemplary embodiment, but is not exhaustive. The fixing structure of the invention is applicable to, for instance, a resin tank in which fuel and cooling water for an internal combustion engine, or fluid oil for actuating working equipment of a construction machine is accumulated.

The invention claimed is:

1. A fixing structure of a resin tank, the fixing structure comprising:
   a first holder having a predetermined length and being disposed corresponding to a pressed portion of the resin tank;
   a biasing member that is disposed in the first holder;
   a pressing member that is supported by the first holder and projects toward the pressed portion by a biasing force of the biasing member; and
   a pair of rods respectively having first ends attached to both ends of the first holder in a longitudinal direction and second ends attachable to a frame, wherein
   the biasing member is a coil spring expandable and contractable in the longitudinal direction of the first holder.

2. The fixing structure of the resin tank according to claim 1, further comprising:
   a second holder that is disposed in parallel to the first holder and in contact with the pressed portion, the second holder being movable in an axial direction of the rods between the first holder and the pressed portion.

3. The fixing structure of the resin tank according to claim 2, wherein the pressed portion is an edge of the resin tank.

4. The fixing structure of the resin tank according to claim 1, wherein the pressed portion is an edge of the resin tank.

5. A fixing structure of a resin tank, the fixing structure comprising:
   a first holder having a predetermined length and being disposed corresponding to a pressed portion of the resin tank;
   a biasing member that is disposed in the first holder;
   a pressing member that is supported by the first holder and projects toward the pressed portion by a biasing force of the biasing member; and
   a pair of rods respectively having first ends attached to both ends of the first holder in a longitudinal direction and second ends attachable to a frame, wherein
   the biasing member is a coil spring expandable and contractable in the longitudinal direction of the first holder,
   the pressing member comprises: an insertion bar that is inserted into the coil spring and is biased by the coil spring in the longitudinal direction of the first holder; a shaft that projects from an end of the insertion bar; and a roller that is rotatably provided at the end of the insertion bar and projects toward the pressed portion, and
   the first holder has an elongated hole through which the shaft is inserted to guide the roller to project toward the pressed portion.

6. A fixing structure of a resin tank, the fixing structure comprising:
   a first holder having a predetermined length and being disposed corresponding to a pressed portion of the resin tank;
   a biasing member that is disposed in the first holder;
   a pressing member that is supported by the first holder and projects toward the pressed portion by a biasing force of the biasing member;
   a pair of rods respectively having first ends attached to both ends of the first holder in a longitudinal direction and second ends attachable to a frame; and
   a second holder that is disposed in parallel to the first holder and in contact with the pressed portion, the second holder being movable in an axial direction of the rods between the first holder and the pressed portion, wherein
   the biasing member is a coil spring expandable and contractable in the longitudinal direction of the first holder,
   the pressing member comprises: an insertion bar that is inserted into the coil spring and is biased by the coil spring in a longitudinal direction of the first holder; a shaft that projects from an end of the insertion bar; and a roller that is rotatably provided at the ends of the insertion bar and projects toward the pressed portion, and
   the first holder has an elongated hole through which the shaft is inserted to guide the roller to project toward the pressed portion.

* * * * *